United States Patent [19]

Sherman

[11] Patent Number: 4,488,009
[45] Date of Patent: Dec. 11, 1984

[54] COMPACT TELEPHONE UNIT WITH A PLUG-IN MODULE

[75] Inventor: Henry Sherman, New York, N.Y.

[73] Assignee: In-Electronic, Paris, France

[21] Appl. No.: 346,312

[22] Filed: Feb. 5, 1982

[30] Foreign Application Priority Data

Oct. 14, 1981 [FR] France ............................ 81 19305

[51] Int. Cl.³ .............................................. H04M 1/00
[52] U.S. Cl. ................................ 179/100 D; 179/103; 179/179
[58] Field of Search ............. 179/100 D, 103, 100.31, 179/100 R, 100 C, 98, 2 C, 178, 179

[56] References Cited

U.S. PATENT DOCUMENTS 3,808,369  4/1974  Libby .................................. 179/1 C
3,916,103  10/1975  Morrell et al. ................... 179/1 PC Primary Examiner—Gene Z. Rubinson
Assistant Examiner—James L. Dwyer
Attorney, Agent, or Firm—James C. Wray

[57] ABSTRACT

A telephone unit comprising a case containing at least a microphone and a loudspeaker and carrying a switch for putting the unit in and out of circuit. The case has in the center part of one of its sides a slot and a multi-contact connector is disposed in facing relation to this slot. The contacts of the connector are electrically connected to at least some of the components within the case. The connector provides the normal connection between these components when the unit is used alone and cooperates with a secondary complementary multi-contact connector which may be plugged in the first-mentioned connector and is connected to circuits which are insertable in the circuit contained in the case by a plugging together of the first connector and second connector.

10 Claims, 9 Drawing Figures

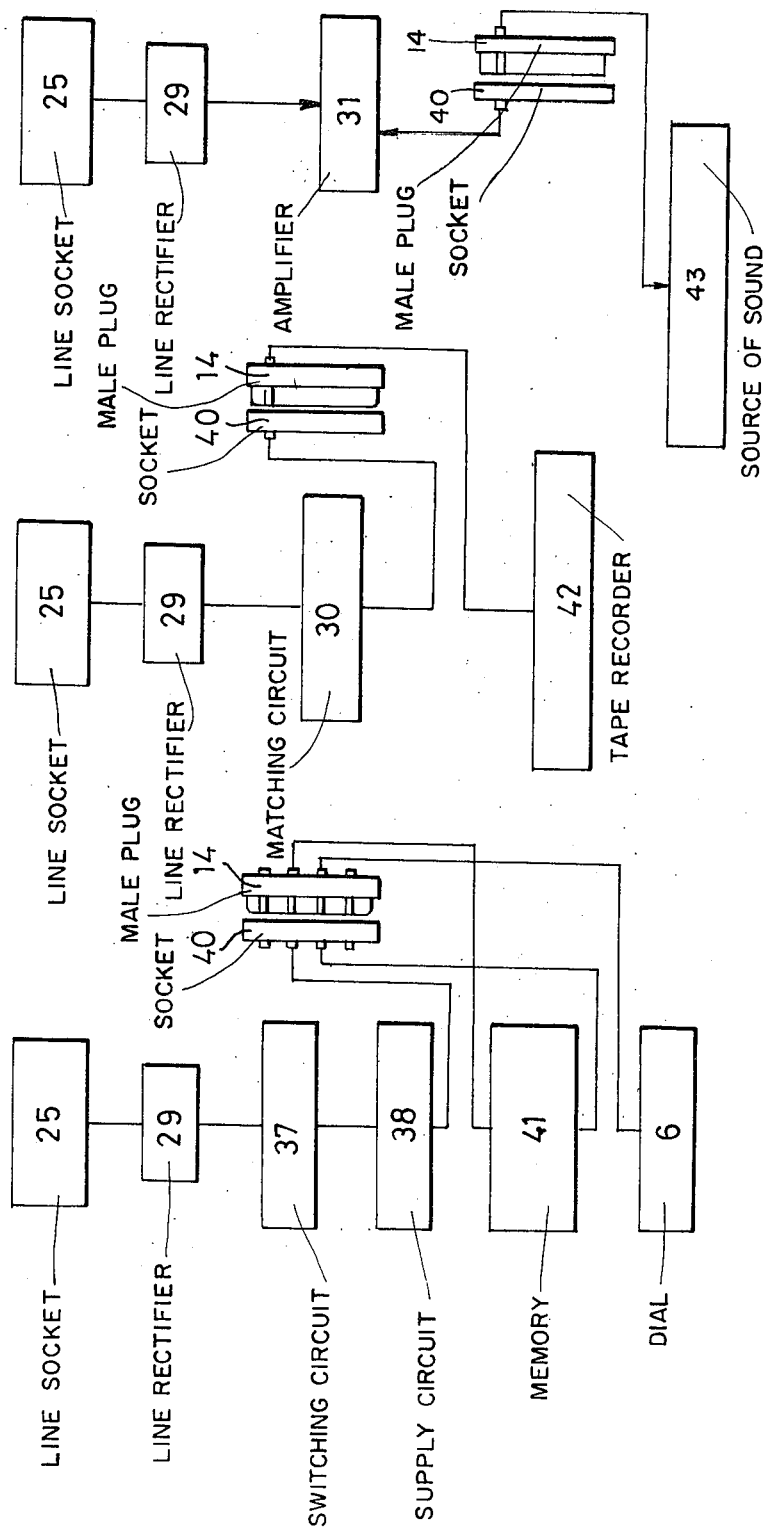

COMPACT TELEPHONE UNIT WITH A PLUG-IN MODULE

The present invention relates to telephone units and more particularly to a compact telephone unit.

Owing to the possibilities offered by the miniaturisation of circuits, there is a tendency at the present time to construct increasingly compact telephone units.

Thus a certain number of compact telephone units are known in which all the circuits and elements for achieving a telephonic connection are located in a single case which henceforth performs both the function of a combined unit and the function of a stand on which the unit is usually placed when the telephone is not being used. However, when the telephone unit must be used with accessory devices, such as an automatic answering device, a music-while-you-wait device, a memory device and a device for automatically searching the numbers of privileged parties to call, the telephone unit must be permanently connected to the accessory devices and this renders such units relatively complicated and space-consuming.

An object of the invention is to overcome the aforementioned drawbacks by providing a telephone unit which, while it is simple and light in construction, may be used alone or in combination with the accessory devices and guarantees the user maximum freedom of movement, bearing in mind, however, the fact that it is connected by a cable to the telephone network.

The invention therefore provides a telephone unit comprising a case containing at least a microphone and a loudspeaker and carrying a switch for putting said unit in and out of circuit, wherein said case has, in one of the sides thereof, a slot in front of which slot there is disposed a multi-connector whose contacts are electrically connected to at least some of the components located within said case, said multi-connector ensuring the normal connection between said components when the telephone unit is used alone and cooperating with a complementary plug-in multi-connector which is connected to circuits which are insertable in the circuit contained in said case by a plugging together of said multi-connector of said unit and said complementary multi-connector.

Further features of the invention will be apparent from the ensuing description which is given solely by way of example with reference to the accompanying drawings, in which:

FIGS. 5–7 are block diagrams of examples of connections of devices associated with the telephone unit of the invention by a plugging together of the unit and the module with which it is associated in FIG. 1;

Figure 1:
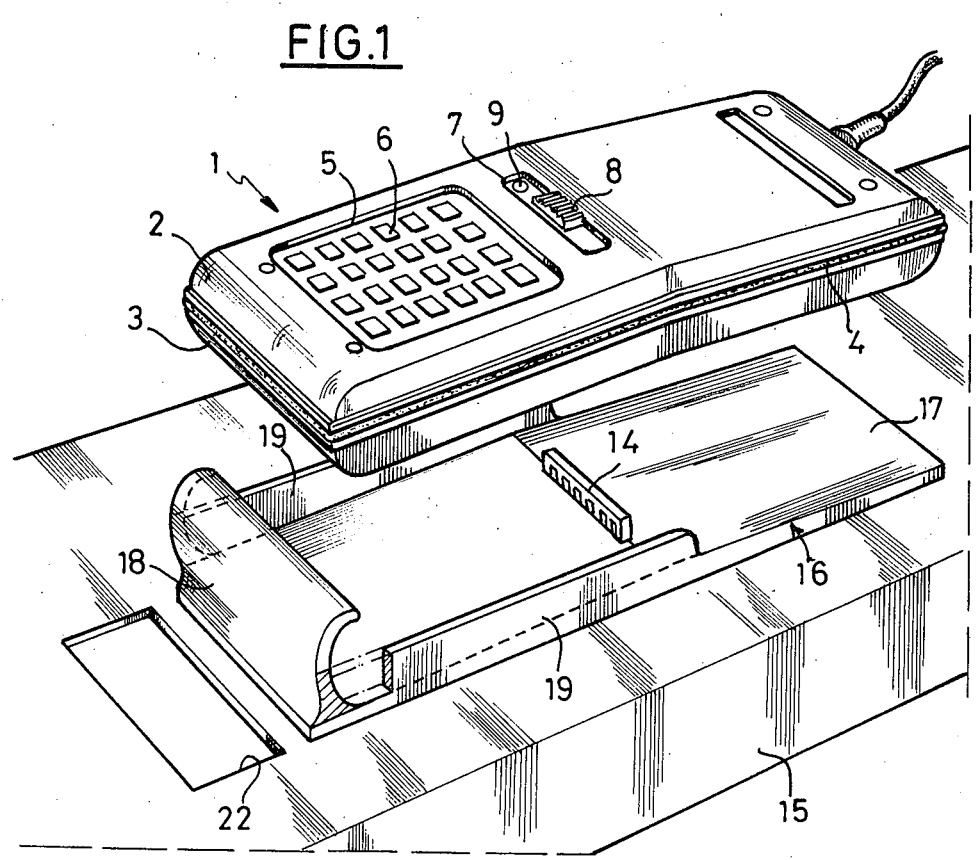
FIG. 1 is a perspective view of a telephone unit according to the invention associated with a module containing auxiliary devices such as a telephonic answering device or some other device.
Figure 2:
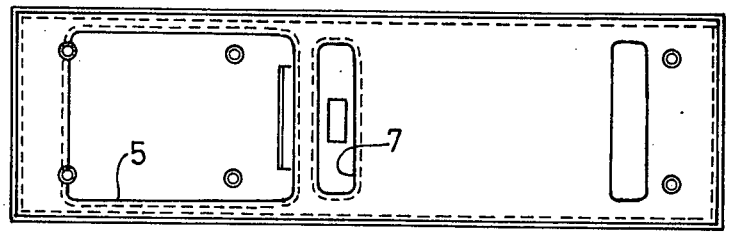
FIG. 2 is a plan view of the exterior of the upper semi-case of the unit shown in FIG. 1.

The telephone unit shown in FIG. 1 comprises a case 1 in the shape of a very wide-angled inverted V formed by an upper semi-case 2 and a lower semi-case 3 which are assembled by screws and between which a sealing element 4 is interposed so as to both seal the case and protect it from lateral blows.

The upper side of the upper semi-case 2 comprises an opening 5 of rectangular shape through which is seen a digital dial 6 for composing the telephone call numbers. In the illustrated embodiment, this dial is of the touch-sensitive type.

In the vicinity of the opening 5 and on the same side as the latter, the semi-case 2 has an aperture 7 for a sliding switch 8 which switches the connection with the telephone line on or off. A light 9 associated with this switch 8 indicates the state of the line.

It will be observed that all of the items of equipment located on the upper side of the upper semi-case 2 are grouped in one of the branches of the V, the other branch being used for holding the telephone unit in the hand. Advantageously, the dial and the line switch are disposed in the part of the semi-case the most remote from the user while the region taken in the hand is in the part of the semi-case adjacent to the user.

Figure 3:
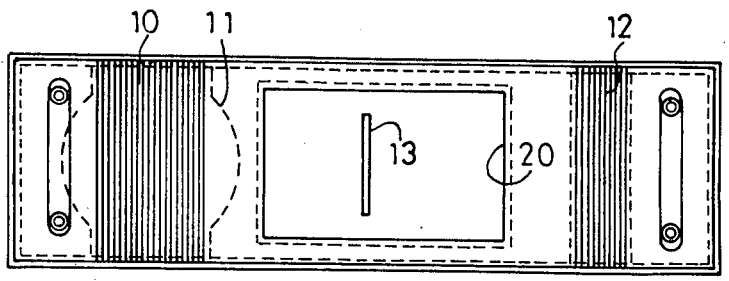
FIG. 3 is a plan view of the exterior of the lower semi-case of the unit shown in FIG. 1.

As can be seen in FIG. 3, the lower side of the lower semi-case 3 has a first grill 10 formed in facing relation to the microphone 11 of the unit and, at the opposite end of the case, a second grill 12 in facing relation to the loudspeaker.

In the central part of the lower side shown in FIG. 3, there is provided a transverse slot 13 for receiving the male plug 14 of a multi-pin conductor adapted to cooperate with a corresponding female socket disposed inside the case behind the slot 13.

In the embodiment shown in FIG. 1, the telephone unit according to the invention is associated with a module 15 which contains a number of accessory items of equipment, examples of which will be described hereinafter, and defines on its upper side a cavity 16 in which the telephone unit as adapted to be engaged.

This cavity 16 has a wide-angled V shape complementary to the V shape of the case 1, the male plug 14 of the connector being disposed at the apex of this bottom. As the cavity 16 is defined by an end ledge 18 of rounded shape corresponding to the rounded shape of the end of the case and adapted to guide the latter when it is placed in position in the cavity and to position the slot 13 of the case with respect to the male plug 14 of the module 15. The cavity 16 is completed by two lateral ledges 19 which laterally guide the case and serve to center it relative to the male plug 14.

Figure 9:
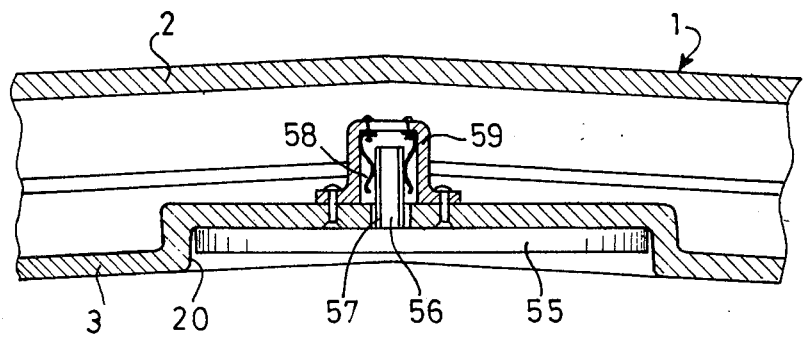
FIG. 9 is a partial sectional view of the telephone unit according to invention in which an integrated circuit card carrying a complementary circuit is plugged.

Thus it can be seen that the arrangement shown in FIG. 1 enables the telephone unit to be placed back into position by a single precise movement whereby the male plug 14 is disposed immediately in facing relation to the slot 13 of the case. With further reference to FIG. 3, there is formed around the slot 13 a flat recess 20 for receiving an integrated circuit card provided with a male connector capable of cooperating with the female socket inside the case and constituted for example by an additional amplifier for users who are hard of hearing, a memory containing the telephone numbers of privileged parties to be called, or a memory containing a code authorising the use of the telephone unit (FIG. 9).

As will be described hereinafter, the telephone unit according to the invention comprises, in a preferred embodiment thereof, the entire circuit required for the operation of the telephone. Consequently, it constitutes an independent unit of use without any accessory support. This is the case of the unit shown in FIG. 1. However, as this unit may be employed with auxiliary equipment, such as an automatic answering device, a musical waiting device and a memory storing telephone numbers, or some other equipment, these auxiliary items of equipment are grouped in the module 15 and are capable of being connected, as soon as the case 1 is placed in position in the cavity 16 therefor, by enagement of the male plug 14, to which these items of equipment are connected, in the slot 13 of the unit 1.

In the illustrated embodiment, the telephone unit includes a telephone call number comprising dial which renders the unit autonomous.

However, in order to lighten the telephone unit, the dial may be transferred to the module 15.

Such a unit may also be used without any dial, in which case it is autonomous only in respect of the reception of calls.

When the telephone unit is used with an integrated circuit plugged in the recess 20 of the lower semi-case, it constitutes a table telephone in itself with no addition of any complementary modules.

According to a particular feature of the invention, the telephone unit has on the upper side thereof the dial and the line switch while the microphone and the loudspeaker are provided on the opposite, lower side of the unit. Such an arrangement renders this unit particularly easy to use, and in particular enables it to be used in plugged-in relation to the module while allowing access to the telephone call number composing dial 6 and the line switch 8.

In this plugged-in position, the dial 6, provided a number of keys are added, may constitute the keyboard of a calculating machine which would be disposed in the module 15. The latter includes for this purpose a display opening 22 associated with the circuit of the calculator.

Figure 8:
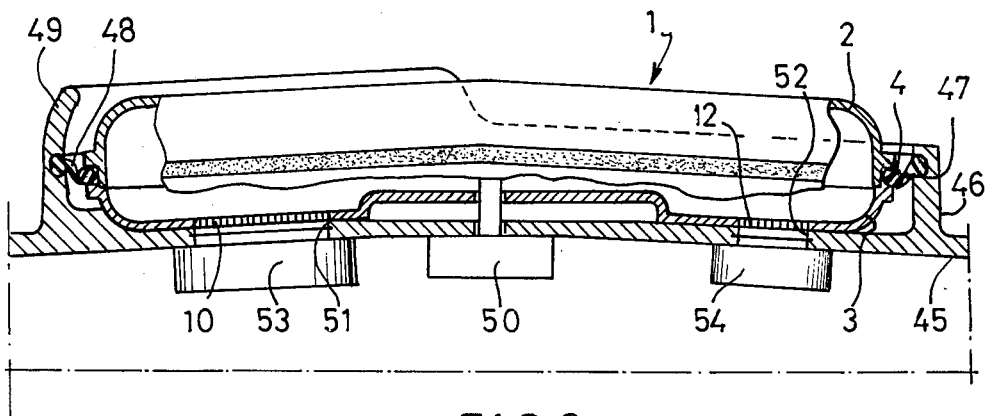
FIG. 8 is a partial sectional view of a telephone unit according to the invention associated with a module comprising acoustic means of connection with said unit.

The sealing element 4 interposed between the two semi-cases 2, 3 protects the case 1 from blows and also constitutes an acoustic sealing element which enables the telephone unit of the invention to be used with acoustic transmitting and receiving means provided in the cavity of the module shown in FIG. 8.

Figure 4:
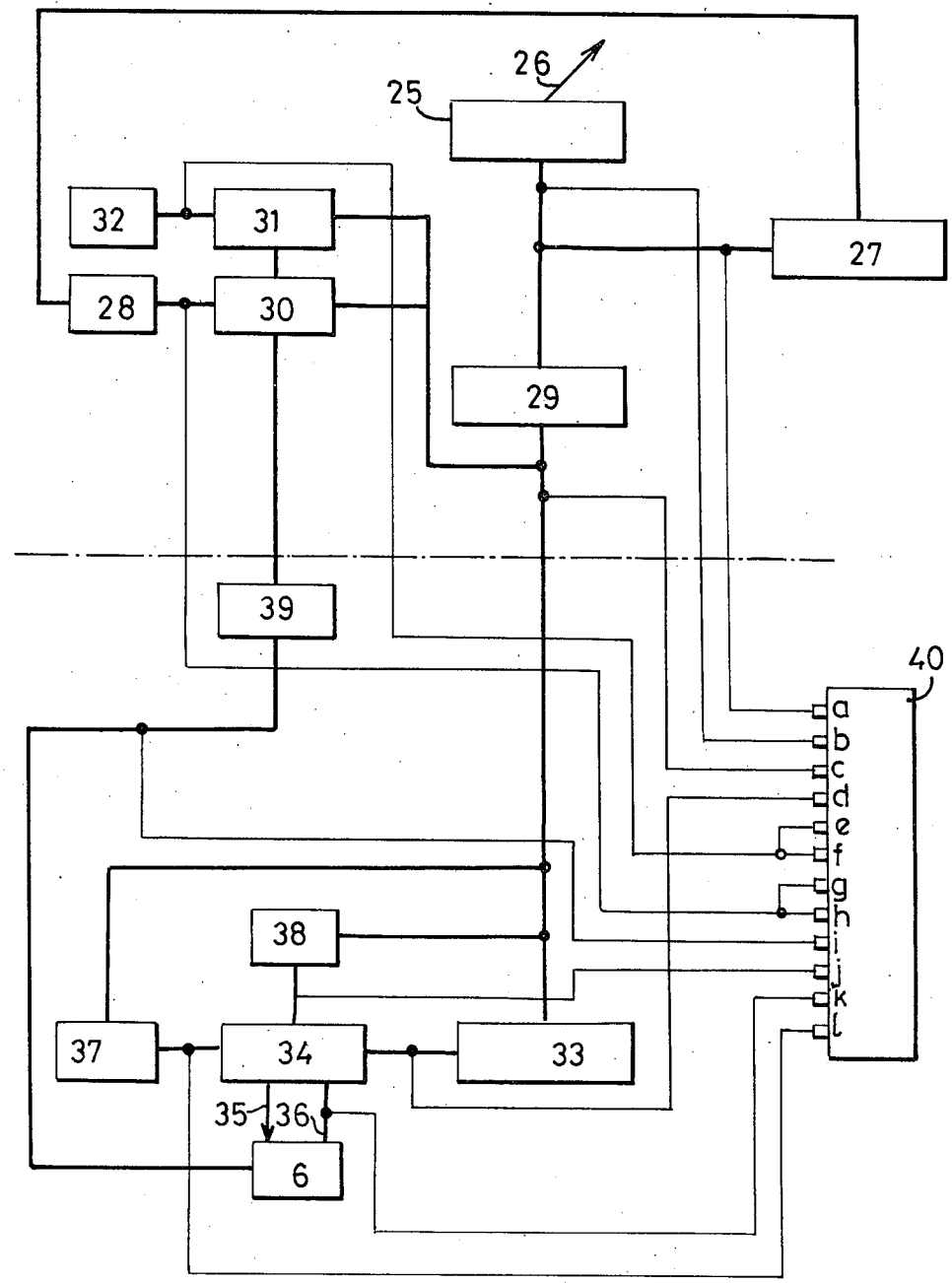
FIG. 4 is a block diagram of the circuit contained in an embodiment of the telephone shown in FIG. 1.

The circuit contained in the case of the telephone unit of the invention is shown in the form of a block diagram in FIG. 4.

This diagram mainly comprises a line socket 25 connected to the conductor 26 which connects the unit to the network. The line socket 25 is furthermore connected to a ringing circuit 27 which is connected in a particular embodiment of the invention to the listening loudspeaker 28 of the unit and to a line rectifier 29. The latter is connected to a matching circuit 30 between the line and the loudspeaker 28 and to a matching amplifier 31 between the line and the microphone 32 of the unit. The line rectifier 29 is connected to a circuit 33 which detects whether the unit is in or out of use. The circuit 33 is connected to a management or processing circuit 34 which is connected to the keyboard or dial 6 through a first line 35 transmitting instructions to said dial and through a second line 36 for receiving data from the dial. The management circuit 34 is furthermore connected to a line-switching circuit 37 which forms the phone call numbers and is connected to a line rectifier 29 and to an oscillator and supply circuit 38. The keyboard or dial 6 is connected to a circuit 39 for attenuating the audio frequency signal which is connected to the matching circuit 30 between the line and the loudspeaker 28. The circuit 30 is connected to the amplifier 31.

The dot-dash line shown in FIG. 4 indicates the separation between the circuits contained in the case 1 and those contained in a possible support for the latter, in the case where it is desired to construct a simplified version of the telephone unit according to the invention. It will be observed that only the circuits associated with the ringing, the microphone and the loudspeaker are contained in the telephone unit proper, the remainder of the circuits being located in the support therefor if it is desired to employ it with a keyboard.

The circuit shown in FIG. 4 also comprises a multicontact socket 40 which is adapted to be disposed in the case 1 in facing relation to the slot 13 and with which the male plug 14 of the module 15 must cooperate. Connected to each contact of the socket 40 is a conductor leading from a junction point between two circuits constituting the circuit of the unit of FIG. 4 the operation of which may be modified either by breaking their connection or by inserting auxiliary equipment therebetween.

In the presently-described embodiment, the socket 40 must include 12 contacts, or groups of contacts, which are respectively connected to twelve remarkable points of the circuit. The contacts of the socket 40 carry the reference characters a–l.

For reasons of greater clarity, the connections between the circuits are shown in relatively thick lines while the connections of the points of junction between these circuits and the contacts of the socket 40 are shown in thinner lines. The connections between the circuits, on one hand, and the connections of the circuits with the socket, on the other, have been represented by lines having a single conductor. However it will be understood that, whenever necessary, the connections are ensured by lines having multi-conductors.

Owing to the fact that all the points of the circuit of the telephone unit according to the invention permitting the insertion of an accessory device are connected to the socket 40, practically all the circuits related to these points may be associated with exterior circuits, for example contained in the module 15 of FIG. 1, by a simple plugging of the male plug 14 in the socket 40. Inversely, the connections thus established may be immediately disconnected when the unit is taken in the hand and the socket 40 is withdrawn from the plug 14. Thus it is possible to employ the elements constituting the circuit of the telephone unit in circuitry which heretofore required the addition of equivalent elements which were particular thereto. Consequently, there is a considerable saving in the construction of the items of equipment associated with the telephone unit.

In the embodiment shown in FIG. 4, the contacts a–l of the socket 40 are respectively connected to the points of junction of the circuits, the list of which follows.

a: ringing circuit 27
b: line socket 25
c: line rectifier 29—detection circuit 33
d: management circuit 34—detection circuit 33
e and f: amplifier 31—microphone 32
e and h: matching circuit 30—loudspeaker 28
i: attenuator 39—keyboard 6 j: management circuit 34—supply 38
k: keyboard 6—management circuit 34
l: management circuit 34—switching circuit 37

The block diagram of FIG. 5 shows an example of the insertion in the circuit of FIG. 4 of a memory containing the telephone numbers of privileged subscribers. The line socket 25 is permanently connected to the switching circuit 37 through the line rectifier 29. But the circuit 37, instead of being connected to the management circuit 34 of FIG. 4, is connected through the oscillator and supply circuit 38 to a memory 41, the connection between the latter two circuits being ensured by contacts of the socket 40 and plug 14.

The memory 41 is furthermore connected to the keyboard 6 also through the socket 40 and the plug 14. Thus it can be seen that the memory is here substituted for the management circuit 34.

The circuit shown in FIG. 6 represents the connection of the telephone unit to a tape recorder by a plugging-in. The line socket 25 is here normally connected to the matching circuit 30 between the loudspeaker 28 and the line through the line rectifier 29, but this circuit is furthermore connected to a tape recorder 42 by insertion of the latter in its circuit when the male plug 14 is inserted in the socket 40.

The circuit shown in FIG. 7 illustrates the insertion in the circuit of a source of sound which may be, as the memory of FIG. 5 and the tape recorder of FIG. 6, contained in the module 15 associated with the unit of FIG. 1. In this circuitry, the line socket 25 is connected to the amplifier 31 matching the microphone 32 to the line through the line rectifier 29 and the latter is connected to a source of sound 43, the insertion of the source of sound for providing music while a caller is waiting being achieved by the insertion of the plug 14 in the socket 40.

The circuit shown in FIG. 4 permits the use of the loudspeaker 28 not only for transmitting the conversation of the called party but also for transmitting the ringing signals. For this purpose, it is sufficient that a point of junction between the matching circuit 30 and the loudspeaker 28 be interrupted by the insertion of the plug 14 in the socket 40 and so as to establish the connection between the ringing circuit 27 and the loudspeaker. The latter is consequently employed as a ringing sound interface and it is used as an audio interface when picking up the telephone unit. The light 9 shown in FIG. 1, which is placed in such manner as to be hidden by the slide of the switch 8 when the latter is in the closed position, is used as a number-forming indicator when acting on the keys of the touch-sensitive keyboard 6. For this purpose, it is connected in such manner as to flicker at the rhythm of the pulses sent through the line by said keyboard. The telephone circuits inside the case 1 may furthermore comprise means for storing the last number composed and a silence key whose function is to put the microphone 32 out of operation.

Owing to the arrangement just described, a number of circuits which constitute the diagram of FIG. 4 may serve for multiple applications, either in the telephone unit itself, or in association with exterior modules. Thus there may be inserted in the cavity 20 of the lower side of the unit 1 an amplifier for the hard-of hearing, a memory of the dialed numbers or any complementary small peritelephonic element. Thus, as just mentioned, the assembly comprising the socket 40 and the plug 14 constitutes a connector which may be used as a coded electronic lock and consequently reserve for the user the functions of his choice, for example, access to trunk calls, access to calls tor foreign countries, access to the keyboard, or access to certain particular applications of the unit.

Within the framework of the applications of the transmission of information between the telephone unit, on one hand, and the module, on the other hand, by means of audio frequency signals, the presence of the O-section sealing element 4 and the seal it provides between the telephone unit and the support therefor when the unit is placed in position, permits a perfect transmission of the sounds between the loudspeaker and the microphone of the telephone unit and possible complementary elements which might be provided in the in the support therefore. Thus it is possible to construct for example an answering device which would be actuated upon the reception of the sounds emitted by the ringing device and which would transmit by way of the microphone 32 of the circuit of FIG. 4, the reception of the reply being ensured by way of the loudspeaker 28 with no electric connection between these components of the telephone unit and the means provided in the associated module, apart, however, from the normal line plug of the telephone unit.

The assembly shown in FIG. 8 comprises a telephone unit similar to that shown in FIG. 1, but the module with which it is associated has the feature of including means for an acoustic connection with the unit.

For this purpose, the module 45 has a cavity 46 for the case which includes a continuous ledge 47 which completely surrounds the case and carries a sealing element 48 in the form of an inwardly-facing lip. The O-section sealing element 4 engaged between the semicases 2 and 3 of the case 1 bears against the sealing element 48 and provides an acoustic insulation between the interior and exterior of the cavity 46.

The peripheral ledge 47 has an end portion 49 which is of upwardly-extending rounded shape so as to facilitate the guiding and positioning of the case 1.

Formed in the bottom of the cavity 46 of the module 45 are, in addition to the passage for the male connector 50, two apertures 51, 52 which are disposed respectively in facing relation to grills 10 and 12 for the microphone and loudspeaker of the unit and are adapted to permit the acoustic connection between a loudspeaker 53 of an automatic answering device and a microphone 54 of a recording device (not shown) contained in the module 45.

The cooperation between the sealing elements 4 and 48 avoids acoustic losses to the exterior so that the acoustic connection thus provided is enhanced.

It will be understood that this acoustic connection between the unit and the module is accompanied by an electric connection by way of a multi-contact connector similar to that shown and described hereinbefore, the male plug 50 of which is shown in FIG. 8.

FIG. 9 shows how a modular circuit 55, for example constituted by an amplifier for the hard-of-hearing, constructed in the form of an integrated circuit card provided with a male plug 56, is placed in the cavity 20 to the telephone unit.

As the amplifier 55 must be inserted between the matching circuit 30 and the loudspeaker 28 of the circuit of FIG. 4, the contacts 57 of the male connector 56 cooperate with corresponding contacts 58 of a female connector 59 placed in the telephone unit 1 connected in a suitable manner to the aforementioned elements 30 and 28 so that the plugging-in of the circuit 55 results in its insertion at the desired place in the circuit of the telephone unit.

In the various embodiments described and illustrated, the female connectors are carried by the telephone unit, and the male connections are located in the modules with which the unit is associated. However, it will be understood that the reverse arrangement may also be adopted.

In the embodiment shown in FIG. 8, the telephone unit is associated with a module comprising an answering device and a recording device 8.

However, the aforementioned module may be a computer module provided that this is equipped with a cavity for the telephone unit similar to that described.

The telephone unit just described, which may be called a compact telephone, is extremely handy, since it permits freely moving about its point of connection to the telephone line. It also makes available additional functions by the simple fact that it is placed on a base containing the appropriate module or modules. Further, it constitutes an evolutive telephone, since it may afford therewithin, owing to the connections provided in advance on its inner multi-pin socket, posibilities of extension by the addition of complementary elements to the exterior module to which it is adapted to be plugged.

Having now described my invention what I claim as new and desire to secure by Letters Patent is:

1. A telephone unit comprising a case, a circuit including components and at least a microphone and a loudspeaker contained in said case, a switch connected to said circuit for selectively turning the circuit on and off, said case having a downwardly facing side defining a slot in the center thereof, a first multi-contact connector which is mounted on said case and placed in facing relation to said slot and comprises contacts which are electrically connected to at least some of said components in said case, said first connector providing a primary connection between said components when the unit is used alone and being cooperative with a second complementary multi-contact connector which may be plugged to said first connector and is connected to accessory circuits which are insertable in said circuit contained in the case by a plugging together of said first connector and said second connector, the microphone and the loudspeaker of said unit being disposed in said case adjacent a lower side of said case and respective grills being defined by said lower side of said case on each side of said slot in facing relation to said microphone and loudspeaker.

2. A telephone unit according to claim 1 wherein said downwardly facing side is concave.

3. A telephone unit according to claim 1 wherein said case is generally V-shaped to define an obtusely angled structure having left and right segments and upper and lower faces, the lower face defining a slot at the vertex of two segments.

4. A telephone unit according to any one of the claims 1 to 3 wherein said switch for putting said unit in and out of circuit is disposed in an upper side of said case.

5. A telephone unit according to any one of the claims 1 to 3, further comprising a digital dial or keyboard for composing telephone numbers and disposed in said case, said dial or keyboard being disposed in an opening formed in an upper side of said case in the vicinity of said switch, said dial or keyboard and said switch being grouped together on one half of said upper side, the opposite half of which is intended to be hand-held by a user.

6. A telephone unit according to any one of the claims 1 to 3, wherein said case comprises two semi-cases which are assembled with interposition of a sealing element which protects said case from blows.

7. A telephone unit according to any one of the claims 1 to 3, in cooperation with a module, said second connector comprising a male plug being mounted on said module which module contains accessory circuits which are interconnected with the circuit contained in said case, said module defining a cavity including a bottom, at least one end ledge and at least one lateral ledge for guiding said unit, said bottom of said cavity having a convex shape which is complementary to the shape of a lower side of said case, said male plug being placed in a projecting part of said bottom so as to come into engagement with said first connector of said case by insertion in said slot of said case when said case is placed in position in said cavity.

8. A telephone unit according to any one of the claims 1 to 3, wherein said case comprises in a lower side thereof a recess which surrounds said slot and is adapted to receive a plug-in integrated circuit module containing at least one additional electronic circuit.

9. A telephone unit according to any one of claims 1 to 3 wherein, owing to the plugging-together of said first connector of said case and said second connector, certain components of said circuit of said unit are interrelated and overlapping with the accessory circuits.

10. A telephone according to claim 7, wherein said case comprises two semi-cases which are assembled with interposition of a sealing element which protects said case from blows, said sealing element also constitutes an acoustic sealing element which cooperates with a peripheral sealing element mounted in said cavity for said case provided in said module, the bottom of said cavity defining apertures for an acoustic connection between said module and said loudspeaker and microphone contained in said case, said apertures being respectively disposed in facing relation to said grills in said case, against which grills said loudspeaker and microphone are mounted.

* * * * *